Nov. 5, 1940.
J. HEINTZ
2,220,715
WINDSHIELD PROTECTOR
Filed Sept. 8, 1938
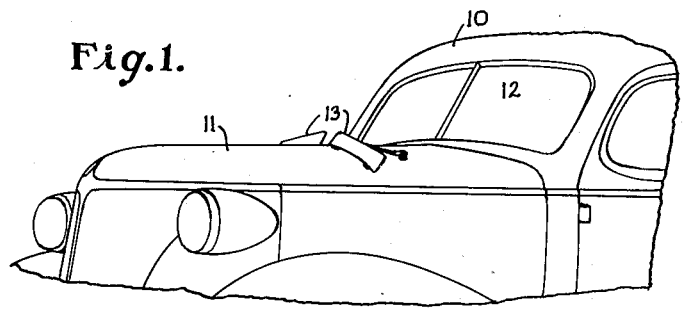
Fig.1.
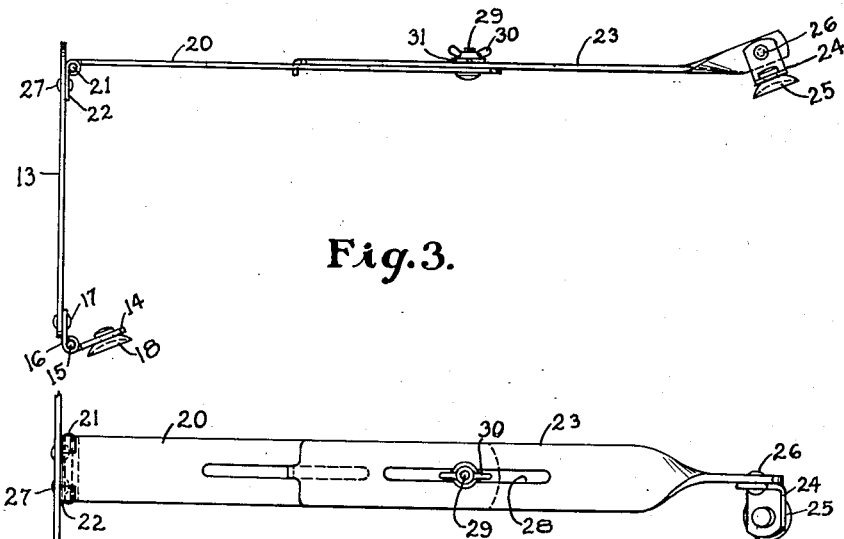
Fig.3.
Fig.4.
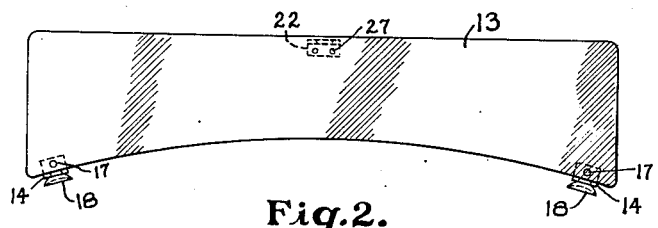
Fig.2.
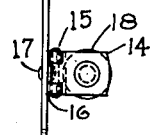
INVENTOR.
John Heintz
BY
ATTORNEY.

Patented Nov. 5, 1940

2,220,715

UNITED STATES PATENT OFFICE 2,220,715

WINDSHIELD PROTECTOR

John Heintz, Chicago, Ill.

Application September 8, 1938, Serial No. 228,940

1 Claim. (Cl. 296—91)

This invention relates to vehicles, and particularly vehicles provided with a windshield, and has for its object an attachment either formed integrally with the vehicle in leading relation to the windshield or removably attached thereto whereby the wind current through which the windshield travels during forward movement of the vehicle may be deflected upwardly beyond the limits of the windshield, maintaining the windshield relatively free from smudging occasioned by the deposit of refuse and excremental matter of insects.

With the above and other objects in view, as will be apparent, this invention consists in the construction, combination and arrangement of parts, as hereinafter more fully described, claimed and illustrated in the accompanying drawing, wherein:

Fig. 1 is a perspective view of a vehicle, showing a windshield and the present invention in conjunction therewith;

Fig. 2 is a front elevational view of the attachment forming the subject of this invention;

Fig. 3 is a side elevational view thereof;

Fig. 4 is a top plan view thereof.

In travelling at relatively high speed, particularly during the season of the year when insects are most prevalent, considerable annoyance and difficulty is experienced in obscured vision through the windshield resulting from the deposit of refuse and excremental matter thereon. This requires frequent cleaning of the windshield.

The present invention contemplates the diversion or deflection of the wind current through which the windshield passes during movement of the vehicle so as to carry the insects upwardly away from the windshield and thus eliminate smudging and otherwise frequent cleaning of the same.

Reference being had more particularly to the drawing, 10 designates a vehicle of standard design, having the usual equipment such as an engine hood 11 and a windshield 12 in trailing relation to the hood 11.

The present attachment comprises a vane or plate 13 of sheet metal, generally rectangular in outline and, as shown in the drawing, adapted to extend the width of the vehicle in leading relation to the driver-confronting portion of the windshield 12. Its lower edge may be curved in substantial harmony with the curvature of the engine hood 11. In order to vary the inclination of the plate 13 favorable to deflecting the wind currents upwardly above the windshield 12, the plate 13 is connected to a pair of feet 14 having a hinge connection 15 to a tongue or ear 16 carried at the lower corners of the plate 13. The ears 16 are connected to the plate 13 by means of pivots 17, whereby the plate may be tilted or rocked about spaced axes perpendicular to the normal plane of the plate. Openings are provided in each of the feet 14 through which suction cups 18 may be inserted. The cups 18 are mounted on the associated foot 14 by means of necks formed on the cups passing through openings in the foot 14. The upper ends of the necks are provided with heads which bear against the upper surfaces of the feet and hold the suction cups in place. Thus each suction cup comprises a body which rests against the undersurface of a foot 14 having a neck which passes through an opening in the foot 14 and a head bearing against the top side of the foot 14. The cups are of such size and depth that the effective surfaces thereof when in their operative positions on the top of an engine hood, as to tightly support the vane or plate 13 in selected positions.

Thus the plate may be swung around the pivots or hinges 15 to occupy selected planes favorable to deflecting wind currents upwardly above the windshield 12, and it may be tilted about axes lengthwise of the engine hood 11 by means of the pivot connection 17, while the foot 14 and the associated cup 18, at each end thereof, are substantially coplanar with the surface of the engine hood.

The plate 13 is steadied in any inclined position by means of a brace consisting of an arm 20 having a hinge connection 21 with a bracket 22 carried by the rear face of the plate 13, and an arm 23. The arm 23 is provided with a foot 24, the latter carrying a suction cup 25 mounted in the same manner as the cups 18 with respect to the feet 14. To accommodate varying inclination of the plate 13, the foot 14 is connected to the lower end of the arm 23 by means of a pivot 26. A pivot connection 27 between the bracket 22 and the plate 13 permits tilting of the plate 13 relative to the arm 20 as well as the arm 23 and its foot 24.

The arm 23 is provided with a longitudinal slot 28. The arms 20 and 23 overlap and a tightening screw 29 extends upwardly through the underlying arm 20 and the slot 28 in the arm 23. An adjusting nut 30 and washer 31 are provided on the upper end of the tightening screw 29, these bearing against the top surface of the arm 23 adjoining the slot 28. It will be seen that when the screw 29, nut 30 and washer 31 are loosened that the brace may be appreciably extended, until the edge of the slot 28 at the outer end of the arm 23 contacts the screw 29. Thus an easy and simple method of adjusting the length of the brace, consisting of the arms 20 and 23, is provided.

The three point suspension thus provided by the feet 14 on the plate and the foot 24, together with the universal pivot provided at the hinge connections at the feet aforesaid, and between the arm 20 and the plate 13, adjustment of the plane and position of the plate 13 is permitted through an unlimited range to meet varying contours of the engine hood as well as varying heights and widths of windshield.

While the foregoing specification sets forth the invention in specific terms, it is to be understood that numerous changes in the shape, size and materials of the plate and its associated parts may be resorted to without departing from the spirit and scope of the invention as claimed hereinafter.

I claim:

An apparatus for maintaining the windshield of a motor vehicle free from smudging occasioned by the deposit of refuse and excremental matter of insects while the vehicle is moving forwardly comprising a plate adapted to extend transversely of the hood of a motor vehicle in leading relation to the windshield thereof, means for removably securing said plate on the hood of a motor vehicle comprising a pair of suction cups mounted in spaced relation transversely of said plate to permit relative angular adjustment of said plate and cups on an axis lengthwise of said plate, and means for locking said plate in selected angular positions comprising an arm pivotally connected to an upper portion of said plate and extending rearwardly therefrom, and a suction cup carried at the rearward end of said arm to permit relative angular adjustment of said arm and cup on axis lengthwise of said plate.

JOHN HEINTZ.